(12) United States Patent
Christian

(10) Patent No.: US 7,159,780 B2
(45) Date of Patent: Jan. 9, 2007

(54) METHOD FOR READING A SYMBOL HAVING ENCODED INFORMATION

(75) Inventor: Michael Christian, White Bear Lake, MN (US)

(73) Assignee: Veritec, Inc., Golden Valley, MN (US)

(*) Notice: Subject to any disclaimer, the term of this patent is extended or adjusted under 35 U.S.C. 154(b) by 354 days.

(21) Appl. No.: 10/404,504

(22) Filed: Mar. 26, 2003

(65) Prior Publication Data
US 2004/0004126 A1 Jan. 8, 2004

Related U.S. Application Data

(60) Provisional application No. 60/394,718, filed on Jul. 8, 2002.

(51) Int. Cl.
*G06K 7/10* (2006.01)

(52) U.S. Cl. .......................... 235/462.25; 235/462.01; 235/494

(58) Field of Classification Search .... 235/462.01–462.48, 235/235/235/235/235/494, 235/470, 472.01, 472.03, 472.02, 456, 454, 235/455; 369/275.1
See application file for complete search history.

(56) References Cited

U.S. PATENT DOCUMENTS

| | | | |
|---|---|---|---|
| 4,166,574 A | 9/1979 | Yokoyama | 235/375 |
| 4,245,152 A * | 1/1981 | Flurry et al. | 235/462.19 |
| 4,874,936 A | 10/1989 | Chandler et al. | 235/494 |
| 4,924,078 A | 5/1990 | Sant'Anselmo et al. | 235/494 |
| 4,937,810 A * | 6/1990 | Drexler et al. | 369/275.1 |
| 4,957,580 A * | 9/1990 | Drexler et al. | 156/250 |
| 4,972,475 A | 11/1990 | Sant'Anselmo | 380/54 |
| 4,988,852 A | 1/1991 | Krishnan | 235/462 |
| 5,050,231 A * | 9/1991 | Watanabe et al. | 382/259 |
| 5,053,609 A | 10/1991 | Priddy et al. | 235/436 |
| 5,331,176 A | 7/1994 | Sant'Anselmo et al. | 250/566 |
| 5,354,977 A | 10/1994 | Roustaei | 235/472 |
| 5,393,967 A | 2/1995 | Rice et al. | 235/454 |
| 5,449,892 A | 9/1995 | Yamada | 235/462 |
| 5,481,095 A | 1/1996 | Mitsuda et al. | 235/454 |

(Continued)

FOREIGN PATENT DOCUMENTS

EP 0 278 740 8/1988
EP 0 484 935 11/1991

*Primary Examiner*—Thien M. Le
(74) *Attorney, Agent, or Firm*—Kagan Binder, PLLC

(57) ABSTRACT

Methods and apparatuses are provided for imaging and decoding symbols such as two-dimensional relief formed symbols and in particular, symbols wherein one or more edges of any number of data cells within the symbols are at least partially discernable. In one aspect of the present invention a symbol image based on a relief pattern, which represents encoded information and includes at least one discernable edge can be determined. Generally, determining an edge of the relief pattern and validating the determined edge by performing an edge analysis of the determined edge can determine the symbol image. A data cell of the symbol image, which at least partially represents information encoded in the relief pattern, can be determined so that the symbol image can be decoded to provide the information encoded within the relief pattern.

32 Claims, 13 Drawing Sheets

U.S. PATENT DOCUMENTS

| | | | |
|---|---|---|---|
| 5,612,524 A | 3/1997 | Sant'Anselmo et al. | 235/494 |
| 5,677,522 A | 10/1997 | Rice et al. | 235/454 |
| 5,742,041 A | 4/1998 | Liu | 235/462 |
| 5,798,513 A * | 8/1998 | Ackley | 235/462.16 |
| 5,811,777 A | 9/1998 | Ackley | 235/462 |
| 5,825,015 A | 10/1998 | Chan | 235/494 |
| 6,024,455 A | 2/2000 | O'Neill et al. | 359/530 |
| 6,105,869 A | 8/2000 | Scharf et al. | 235/454 |
| 6,152,370 A | 11/2000 | Ackley | 235/462.01 |
| 6,164,542 A * | 12/2000 | Ackley | 235/462.16 |
| 6,173,893 B1 | 1/2001 | Maltsev et al. | 235/462.09 |
| 6,182,901 B1 | 2/2001 | Hecht et al. | 235/494 |
| 6,250,551 B1 | 6/2001 | He et al. | 235/462.07 |
| 6,318,637 B1 | 11/2001 | Stoner | 235/472.01 |
| 6,330,974 B1 | 12/2001 | Ackley | 235/472.01 |
| 6,342,935 B1 | 1/2002 | Jang et al. | 349/113 |
| 6,347,163 B1 | 2/2002 | Roustaei | 382/324 |
| 6,367,699 B1 | 4/2002 | Ackley | 235/462.49 |
| 6,533,183 B1 * | 3/2003 | Aasmul et al. | 235/494 |
| 6,612,497 B1 * | 9/2003 | Iida et al. | 235/462.25 |
| 6,634,554 B1 * | 10/2003 | Merchant | 235/462.23 |
| 2002/0000471 A1 * | 1/2002 | Aasmul et al. | 235/462.45 |
| 2002/0041712 A1 | 4/2002 | Roustaei et al. | 382/199 |

* cited by examiner

METHOD FOR READING A SYMBOL HAVING ENCODED INFORMATION

CROSS-REFERENCE TO RELATED APPLICATION

The present non-provisional Application claims the benefit of commonly assigned provisional Application having serial No. 60/394,718, filed on Jul. 8, 2002, and entitled METHOD FOR READING A SYMBOL HAVING ENCODED INFORMATION, which Application is incorporated herein by reference in its entirety.

FIELD OF THE INVENTION

The present invention relates to methods and apparatuses for reading and decoding symbols having encoded information. In particular, the present invention relates to methods and apparatuses for reading and decoding signals produced from two-dimensional relief formed symbols.

BACKGROUND OF THE INVENTION

Optical imaging systems are commonly used to decipher data symbols printed on objects in order to identify the objects or to obtain information relating to the object. A bar code symbol is a common one-dimensional form of symbology, and typically comprises a pattern of vertical bars of various widths separated by spaces of various widths. Because the bar and space elements have different light reflecting characteristics, a reader can convert a symbol into an electrical signal by analyzing the light reflected from the symbol. The electrical signal can then be analyzed and decoded to provide an alphanumeric representation of the symbol, which can contain certain information about the object. Bar code symbols of this type are now in common usage in various applications, such as inventory control, point of sale identification, or logistical tracking systems.

Because conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square marks disposed at particular rows and columns of the matrix correspond to the information being conveyed. As a result, a two-dimensional matrix symbology can include significantly more data within a given volume of space than a conventional one-dimensional bar code.

Many bar code symbols are printed on labels, which are affixed to objects, boxes, etc. Alternatively, bar codes can be set in relief or formed within the surface of an object. This can be done by stamping, engraving, etching, milling, molding, or by other known methods. The symbols can be either raised from the surface or depressed within the surface. Such relief formed symbols can be more durable, less expensive, and provide other benefits of typical bar code labels. However, such relief formed symbols can be difficult to read using currently available non-contact scanning techniques, because the contrast between raised and recessed portions of the symbol is generally low. For example, if a laser scanner scans a relief formed symbol, both the high and low regions of the symbol reflect the scanning beam substantially equally thereby making differentiation between the high and low regions very difficult.

One particular application of a two-dimensional symbology utilizes a two-dimensional symbol in the manufacture of microelectronics devices such as certain flat panel displays. Typically, a symbol is formed directly on a display substrate, which is usually glass, by printing with appropriate ink or other suitable technique. Alternatively, the symbol could be formed directly onto the substrate by laser etching or other suitable precision relief forming process. Because a two-dimensional symbology can compress a large amount of data within a relatively small dimensional space, the symbol can store a unique identifier code for the substrate, including such information as serial number, lot number, batch number, model number, and/or customer code. As such, the symbols can be used to automate the manufacturing or testing processes, and may also enable manufacturers to protect against component theft or forgery.

Generally, such symbols formed on typical substrates may be readable with conventionally known equipment. However, an early processing step in the manufacture of certain flat panel displays, such as liquid crystal displays, necessarily covers the entire substrate, including the symbol, with a thin-film coating of a highly reflective metal such as chromium. Because such metal coatings are usually conformal in nature and very thin, the relief aspects of the symbol formed on the substrate are usually preserved in the thin-film coating thereby forming a buried relief symbol. A significant drawback of such buried relief symbols is that they generally have little or no light reflecting contrast and, as a result, can be very difficult to image. Because the symbol characters are buried beneath a metal thin-film, any color difference that existed between the characters and the substrate can no longer be utilized for imaging the symbol. To compound this problem, the metal thin-film usually has a shiny surface finish that tends to further obscure the symbol characters.

SUMMARY OF THE INVENTION

The present invention overcomes the disadvantages and shortcomings of the prior art by providing methods and apparatuses for imaging and decoding certain symbols such as two-dimensional relief formed symbols. In particular the present invention advantageously provides apparatuses and methods to read and decode symbols wherein one or more edges of any number of data cells within the symbols are at least partially discernable. Also, methods and apparatuses in accordance with the present invention can advantageously be used to perform an edge analysis for determining the validity of such edges for decoding the symbols.

In one aspect of the present invention a symbol image based on a relief pattern, which represents encoded information and includes at least one discernable edge can be determined. Generally, determining an edge of the relief pattern and validating the determined edge by performing an edge analysis of the determined edge can determine the symbol image. A data cell of the symbol image, which at least partially represents information encoded in the relief pattern, can be determined so that the symbol image can be decoded to provide the information encoded within the relief pattern.

In another aspect of the present invention an apparatus for reading a relief pattern having at least one discernable edge and representing encoded information is provided. Generally, the apparatus includes means for creating an edge image from a reflected light pattern and means for verifying the validity of an edge of the edge image. The edge image is preferably created from light reflected from the relief pattern. The validity of an edge of the edge image is preferably determined so that a data cell of a symbol image based on the relief pattern can be decoded to provide the information encoded within the relief pattern.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

The present invention is directed to methods and apparatuses for effectively reading and decoding certain images or symbols such as relief symbols. In particular, the present invention has been developed to analyze images of symbols containing one or more edges of any number of data cells which may comprise geometric shapes contained within the symbols and which data cells generally provide coded information that can be read in accordance with the present invention. Such methods and apparatuses in accordance with the present invention can advantageously also be used to perform an edge analysis for determining the validity of such edges for decoding the symbols.

The principles of the present invention may be applied to any symbol from any linear or stacked area, or other symbology, and preferably those symbols formed as area relief patterns, as discussed below. An area symbology, as used herein, refers to any symbology, such as those commercially known under the tradenames Vericode™ or Data Matrix™ or Code One™ or the like, that employs a matrix of data cells, rather than one or more rows of bars and spaces. A stacked symbology, as used herein, refers to any symbology, such as PDF 417, that generally employs several adjacent rows of symbols, each row having several characters defined by groups of multiple-width bars and spaces.

Figure 1:
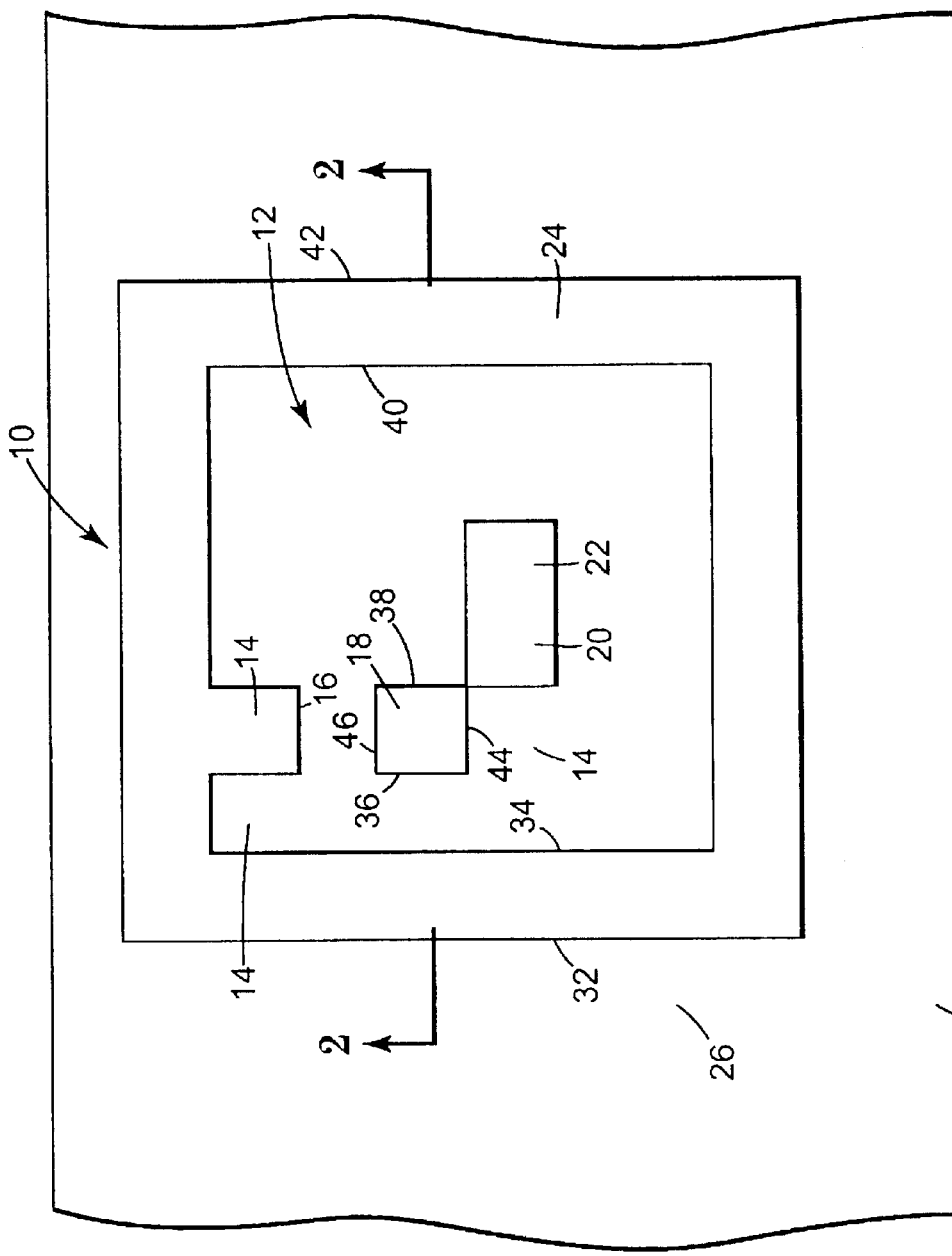
FIG. 1 is an exemplary two-dimensional symbol shown on a substrate and showing in particular an internal data field of the symbol comprising a plurality of data cells.

Area symbologies are well known, such as are described in U.S. Pat. Nos. 5,612,524, and 4,924,078, the entire disclosures of which are incorporated herein by reference for all purposes. A typical symbol 10 from such an area symbology is illustrated in FIG. 1. Generally, the symbol 10 includes an internal data field 12 with internal data cells 14 arranged in a matrix, which data field 12 and data cells 14 are preferably rectangular as illustrated, although any other shapes are contemplated. As shown, the internal data field 12 has certain data cells 14 that are "on" and certain data cells 14 that are "off." As shown, the "on" cells are black (the cells designated by reference numerals 16, 18, 20, and 22) while the "off" cells are white (the remaining cells of the internal data field 12). Such on and off designations are used in decoding a symbol such as the symbol 10. It is understood that any binary designation may be used for differentiating between data cells 14 including on and off, 0 and 1, as well as black and white.

As illustrated, the internal data field 12 is preferably surrounded by an orientation and/or timing data cell border 24, which is typically used for timing and symbol orientation. The border is typically formed from "on" data cells as illustrated. An external data field 26 surrounding the border 24 may be provided, which may include external data cells (not shown) for providing additional information on orientation, timing or symbol identification. Preferably, surrounding the border 24 or the external data field 26, if provided, is a quite zone equivalent to one or more concentric rectilinear rings of "off" data cells surrounding the outermost pattern of "on" cells. The required number of concentric rectilinear rings of the quite zone may be determined by the environmental factors of symbol usage. Alternatively, the external data field 26 can act as a quiet zone or can be surrounded by a further quiet zone.

The symbol 10 may be formed directly on a substrate 28 such as by printing or controlled deposition of inks or other coatings, or may be provided onto a sticker or label by printing or any other suitable technique and then adhered or otherwise attached to a substrate. Alternatively, the symbol 10 can also be etched, engraved, or otherwise formed as a relief pattern on a suitable substrate or object. As an example, the substrate 28 may be a glass substrate and the symbol 10 may be printed on the substrate 28 with appropriate ink or the like so as to have any appropriate thickness that is capable of forming a relief symbol. To be capable of forming a relief symbol, the thickness of the symbol must merely be discernible as part of an edge analysis conducted as described below. It is understood that the substrate 28 may be any substrate or object capable of having a symbol formed thereon and that the symbol may be formed as a high contrast symbol, low contrast symbol, relief symbol, non-relief symbol, or as any other known or developed format and may be formed by any technique.

Figure 2:
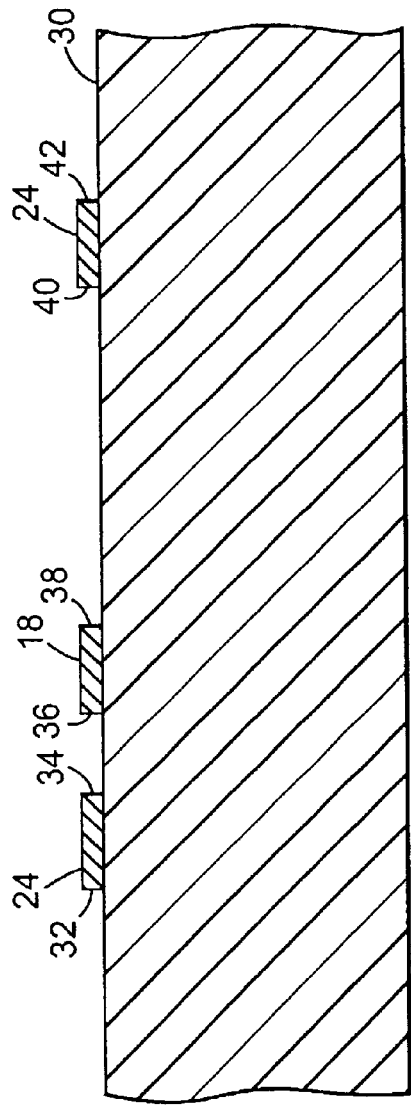
FIG. 2 is a cross-sectional view of the symbol of FIG. 1 taken along line 2—2 showing in particular portions of the symbol that are raised above a surface of the substrate thereby forming a relief symbol.

In FIG. 2, a cross-sectional view of the symbol 10 of FIG. 1 is shown. Generally, the border 24 and the data cells 14, such as the data cell 18, are provided as raised regions with respect to a surface 30 of the substrate 28 when the symbol 10 is formed as a relief symbol. Alternatively, the border 24 and the data cells 14 may be formed as recessed regions with respect to the surface 30 of the substrate 28. Such raised or recessed regions include one or more discernible edges thereof. As shown, the portion of the border 24 on the left side has edges 32 and 34, the data cell 18 has edges 36 and 38, and the portion of the border 24 on the right side has edges 40 and 42. It is noted that the illustrated symbol 10 includes additional edges not visible in the cross-section of FIG. 2. For example, referring back to FIG. 1, the data cell 18 includes edges 44 and 46.

For certain applications, the entire symbol 10 or certain portions of the symbol, such as the data cells 14 or the border 24 may be formed so that there is little or no contrast in light reflectivity between the symbol 10 and the surface 30 of the substrate 28. For example, a symbol such as the symbol 10 may be printed or otherwise formed on a substrate wherein the color of the symbol and the color of the substrate are substantially the same. In the case of a relief symbol etched or formed directly into a substrate, little or no contrast may be present because the symbol is formed directly into the bulk of the substrate and no color difference is present.

Alternatively, a symbol such as the symbol 10 may be covered (at least partially) with a coating, either intentionally or unintentionally, so that any contrast that may have been originally present between the symbol and the substrate is no longer substantially present. Such coatings may include inks and/or paints from writing or other marking devices, or other coatings from a deposition process.

Figure 3:
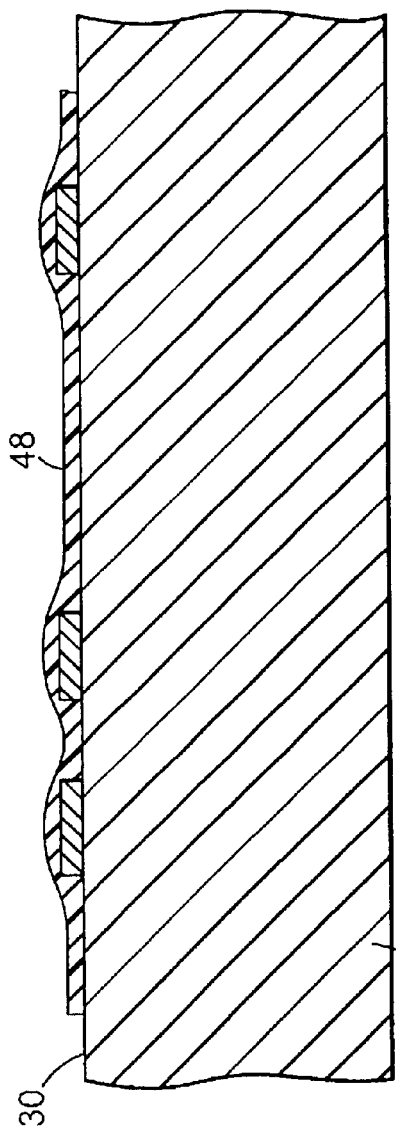
FIG. 3 is a cross-sectional view of the symbol of FIG. 1 also taken along line 2—2 out further including a coating covering the symbol.

Coatings may also be formed as part of a manufacturing process. One example can be found in microelectronics device manufacturing technology such as flat panel display manufacturing technology. Referring to FIG. 3, a symbol such as the symbol 10 may be formed on the surface 30 of the substrate 28, which symbol 10 may contain a unique identifier code for the substrate 28, including such information as serial number, lot number, batch number, etc. Typically, the substrate 10 for a flat panel display is a glass or ceramic substrate and the symbol 10 may be formed thereon by an appropriate technique such as by using photolithography or the like. In the manufacture of certain microelectronics devices, such as liquid crystal displays, part of the process includes covering a substantial portion of the substrate with a coating 48 such as a thin metal film, for example chromium. Because such coatings are usually conformal in nature and very thin, the relief aspects of the symbol formed on the substrate are substantially preserved in the thin-film coating. A significant drawback of such relief symbols is that they generally have little or no contrast in light reflectivity and, as a result, can be very difficult to image and decode using conventional light reflectivity reading. Because the symbol characters become buried beneath a metal thin-film in such applications, the color difference that existed between the characters and the substrate no longer can be utilized in viewing or reading the symbol. To compound this problem, a metal thin-film such as chromium provides a shiny or highly reflective surface finish that tends to further obscure the geometric shapes that make up the symbol characters such as the data cells 14. As such, the information contained in the symbol is contained in the spatial domain and cannot be read with conventionally known readers. Accordingly, the inventive aspects of the present invention provide methods and apparatuses for imaging and decoding such symbols.

Figure 4:
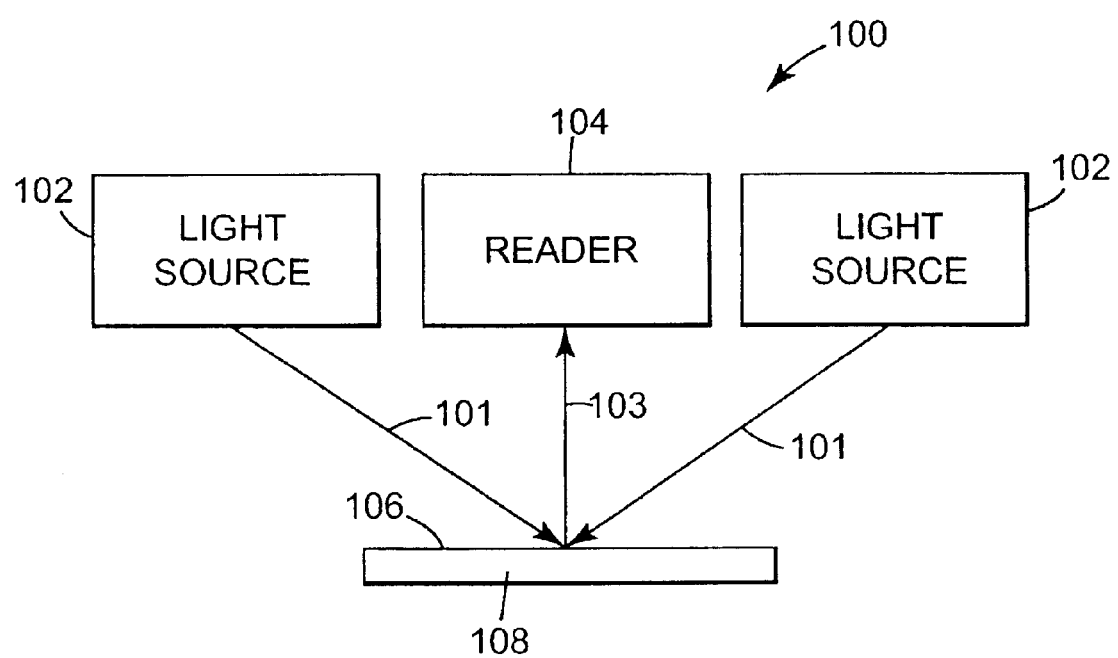
FIG. 4 is a schematic block diagram of an exemplary imaging system including a light source and a reader in accordance with an aspect of the present invention for imaging and decoding a symbol such as the symbols shown in FIGS. 1, 2 and 3.

Referring next to FIG. 4, an imaging system 100 for reading symbols such as the relief symbols described above is illustrated. Generally, the imaging system 100 comprises one or more light sources 102 and a reader 104. As shown, a light beam 101 from the light source 102 impinges upon a surface 106 of a substrate 108 where it is reflected as a light beam 103 to be received by the reader 104. Preferably, the light source 102 is capable of edge illumination of relief patterns. In particular, the light source 102 is preferably capable of at least partially illuminating at least some edges within a symbol formed on the surface 106 of the substrate 108. Suitable lights for illuminating edges include those used in conventionally known dark field optical microscopy devices and illumination sources. In any case, the light source 102 can comprise any known or developed device for generating light such as an incandescent light source, a light emitting or laser diode, etc.

The light source 102 may be oriented in any manner as long as at least one or more edges can be discerned. Where the symbol edge(s) are substantially perpendicular to the substrate, for example, the light source 102 should be at least somewhat obliquely oriented to show the edge(s). As shown, the light source 102 may be offset from the reader 104, which is preferably positioned above a portion to the substrate 108 to be analyzed by the reader 104. As one example, a ring light formed from light emitting diodes or the like may be used. Such a ring light can obliquely provide light from all sides of a substrate thereby illuminating the edges. Any light sensor can be utilized within the reader 104 based upon the type of light reflected, which one or more sensors may be arranged to receive reflected light and to provide signals representing the detected edge pattern. Moreover, the light source 102 and/or the reader 104 may be moved relative to the substrate or to each other to scan for edges.

Figure 5:
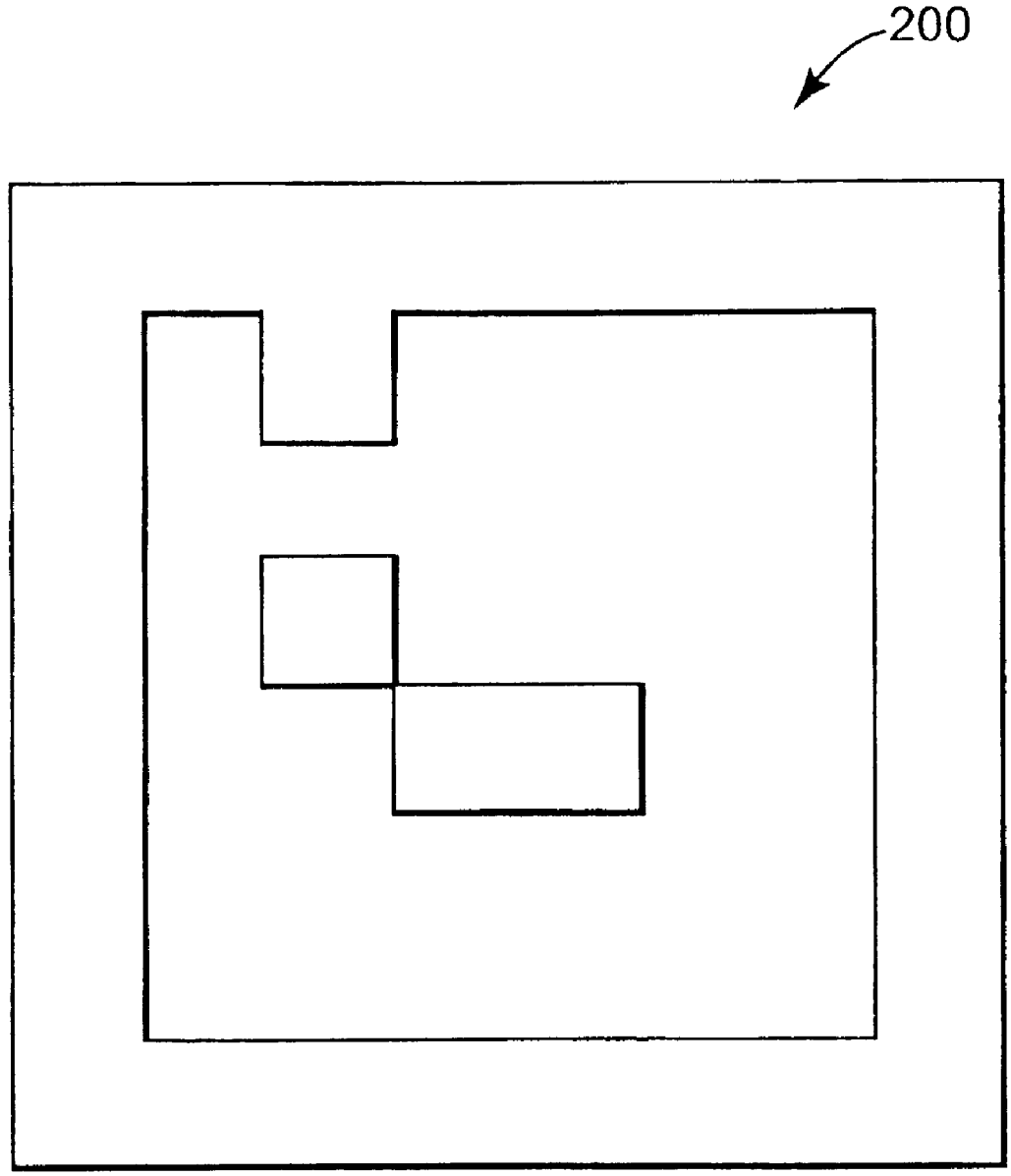
FIG. 5 is an edge image of the symbol shown in FIG. 1 as imaged according to an aspect of the present invention such as by the imaging system shown in FIG. 4 and showing in particular edges of the raised portions of the symbol.

In FIG. 5, the symbol 10 of FIG. 3 that may be coated with the coating 48 is illustrated as it would appear when illuminated with one or more appropriate light source such as the edge illumination capable light source 102 previously described thereby forming an edge image 200 of the symbol 10. As can be seen, edges of raised portions of the relief symbol are read.

Figure 6:
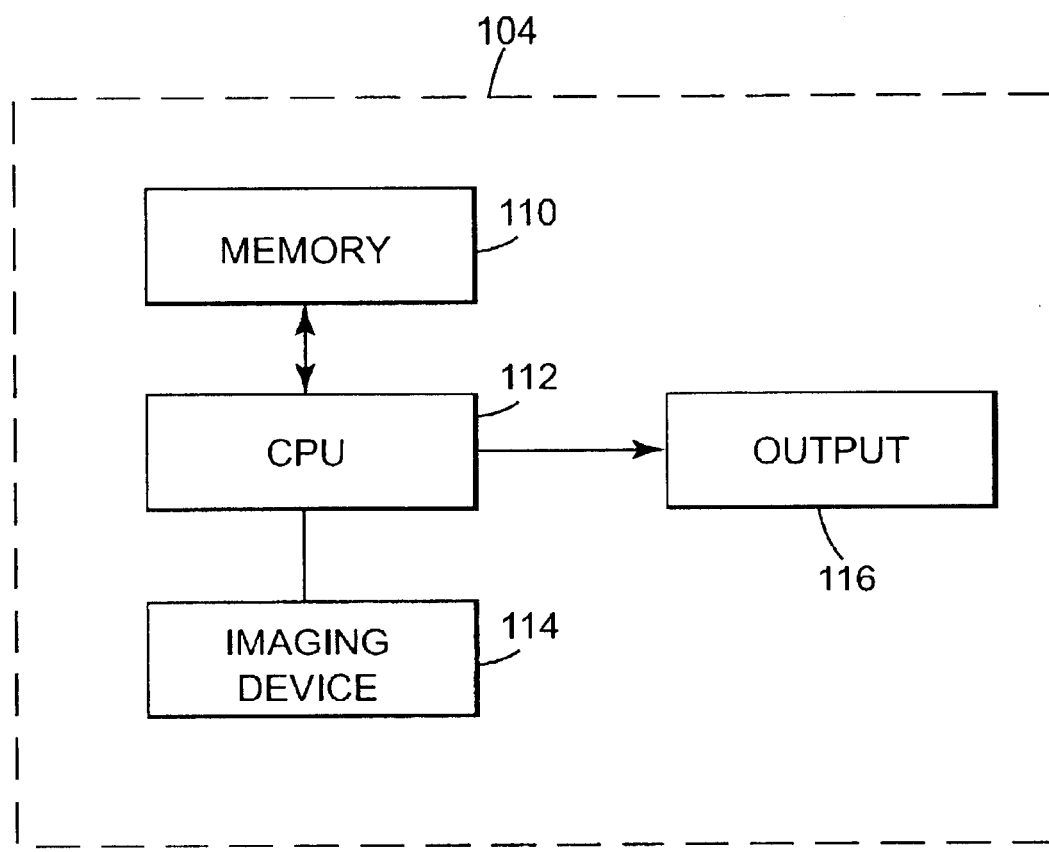
FIG. 6 is a schematic block diagram of a reader usable in accordance with the present invention having a imaging device and an output in accordance with an aspect of the present invention for processing a symbol such as the edge image shown in FIG. 5.

In FIG. 6, an exemplary embodiment of a reader 104 in accordance with the present invention is illustrated. The reader 104 can comprises memory 110, a central processing unit or CPU 112, an imaging device 114, and an output 116. For certain applications, the imaging system 100 may also include a gain control (not shown) for controlling the output level of signals produced by the imaging device 114 and a light level detector (not shown).

The entire imaging system 100 may be contained within a single unit. Alternatively, the elements may be distributed so that a simple, lightweight unit is used to create image data and to transmit the data to a central unit for further processing. The image data may then be transmitted to an attached computer, stored locally for later transfer or forwarded to an application program resident within the imaging system itself.

The CPU 112 preferably controls certain operations of the imaging system 100 in accordance with instruction sets, e.g., software or firmware, stored in the memory 110. It is contemplated that the CPU 112 may control operations, such as decoding image data stored in the memory 110, transferring the image data to other systems, activation of the light source 102, and the storing of data in the memory 110. It is also noted that multiple CPU's may be used for performing individual tasks such as decoding.

Any conventional CPU 112 or microprocessor may be used with the present invention. The memory 110 preferably comprises a semiconductor-based read only memory (ROM) device because such devices are non-volatile and permit the stored instructions to remain in storage within the devices even after electrical power is removed. Other memory devices are also contemplated.

It is contemplated that the functions performed by the stored instruction set may also be accomplished by traditional hard wired circuits; however software or firmware systems are preferred due to their relative simplicity, adaptability to change, and low cost. It is also contemplated that any ROM devices such as the memory 110 may further be erasable or programmable, so that modifications or revisions to the software can be implemented as desired. Moreover, other permanent storage media can be utilized as memory 110, such as magnetic or optical disks.

In one aspect of the present invention, the imaging device 114 preferably converts received light into a plurality of electrical signals that correspond to the intensity of the received light. The plurality of electrical signals may then be further amplified and converted into digitized data, which represent an image of the substrate 108 including a symbol to be read. The imaging device 114 may comprise a charge coupled device (CCD), for example. Moreover, one such imaging device may use complimentary-metal-oxide-semiconductor (CMOS) technology. Typically, a CCD comprises a one-dimensional or two-dimensional array of adjacent photodiodes with each photodiode defining a distinct picture element (or pixel) of the array. It is noted that the array of the CCD imaging element is not limited to any particular pattern. For example, the array can be arranged in the usual order of linear rows and columns; the array can be arranged in a diamond pattern in which the rows are linear and the columns are offset in a regular fashion; or the array can be arranged in any other pattern in which the photodiodes are ordered relative to each other.

Each photodiode of the CCD array generates a voltage and/or current that represents the intensity of the light reflected onto the particular photodiode. The CCD array is scanned electronically by activating the individual photodiodes in a sequential manner in order to produce an output signal containing the voltage and/or current levels from each photodiode. The detected voltage and/or current levels are then preferably amplified and converted to binary data values. After the imaging device 114 converts the received light into binary data values representing an image of the symbol, the binary data values may be transmitted to the memory 110, which may also include conventional semiconductor-based random access memory (RAM).

For certain applications the imaging device 114 may also include a light level detector (not shown) for detecting the intensity level of the light reflected onto the imaging device 114. The light level detector may provide a digitized output to the CPU 112 indicating the instantaneous intensity level of the light reflected onto the imaging device 114. Such light level detectors are well known in the art, and any suitable detector can be used with the present invention.

A preferred method of effectively reading such a relief symbol in accordance with the present invention generally comprises performing an edge analysis of an image such as that of the edge image 200 shown in FIG. 5. Preferably, a multi-step edge analysis is performed in order to efficiently and reliably read such a relief symbol but also to eliminate invalid edges and to assign binary values to the data cells of the symbol for use in decoding the symbol. Invalid edges may be present in such an image for a variety of reasons. For example, such images, especially those for relief symbols covered with some coating as described above can be difficult to image and may contain artifacts and/or features which appear to be edges of the underlying symbol. Also, dust and dirt, as well as smudges or other extraneous marks may appear to be edges. Accordingly, the principles and concepts of the present invention are useful for analyzing such images in determining the validity or invalidity of potential edges and will be discussed with reference to the exemplary edge image 200 shown in FIG. 5 and the process flowchart shown in FIG. 7.

Figure 7:
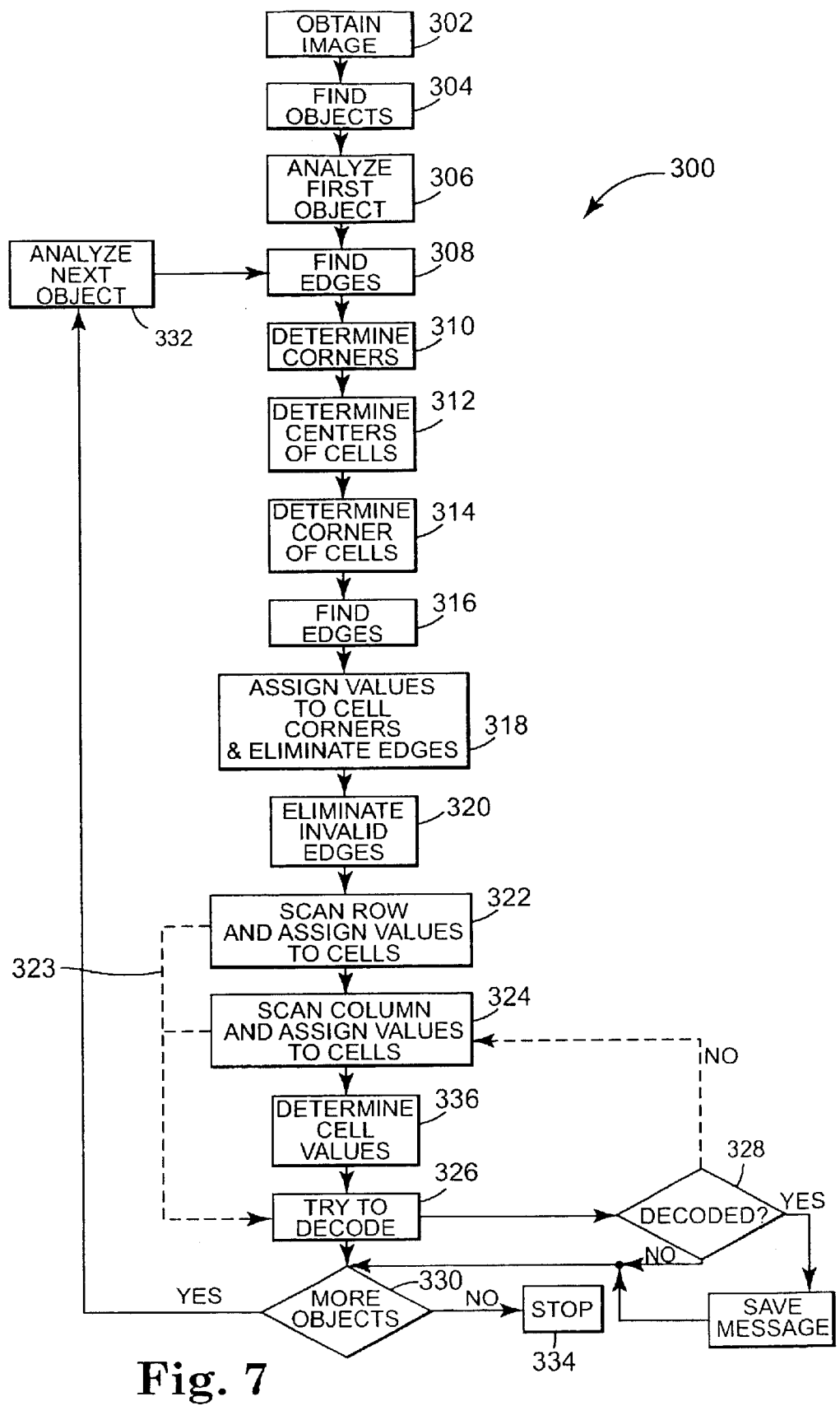
FIG. 7 is a flowchart of a edge analysis algorithm in accordance with the present invention.

Referring to FIG. 7, a preferred process 300 for decoding a symbol in accordance with the present invention is shown. An initial step 302 obtains an image to be analyzed such as the edge image 200 shown in FIG. 5. An image may be obtained by any known or developed technique such as by using a conventional camera or by using the imaging system 100 discussed above. It is noted that an image may contain a single symbol to be decoded or may contain multiple symbols to be either simultaneously or sequentially decoded in accordance with the present invention.

A next step 304 finds objects within an image obtained in step 302. For example, regions or areas of contrast may be identified as objects to be analyzed. Generally, an image can contain valid symbols as well as objects that appear to be symbols such as smudges or extraneous marks, writing, and other symbols, which do not contain coded information. Preferably, the step 304 identifies all objects within an image of interest that may be symbols or portions of symbols. Such may be accomplished by using known or developed image processing or graphical analysis techniques to determine and evaluate areas of contrast, color, shape, etc. Such image analysis techniques are well known and commercially available. It is contemplated that multiple objects within a symbol may be prioritized or ranked such that they are analyzed in a particular order. For example, objects may be ranked based on size or shape such that an object that is likely to be a valid symbol is analyzed before an object that is not.

A step 306 begins the analysis of a first object identified in step 304. It is contemplated, however, that all of the objects identified by step 304 may be simultaneously analyzed such as by using multiple image analysis systems or another similar approach. A step 308 finds the edges or outside boundaries of the object being analyzed such as the edge image 200 shown in FIG. 5. Any technique for determining the edges of the object may be used. One preferred technique is to use a Hough transform, which determines straight lines.

Figure 8:
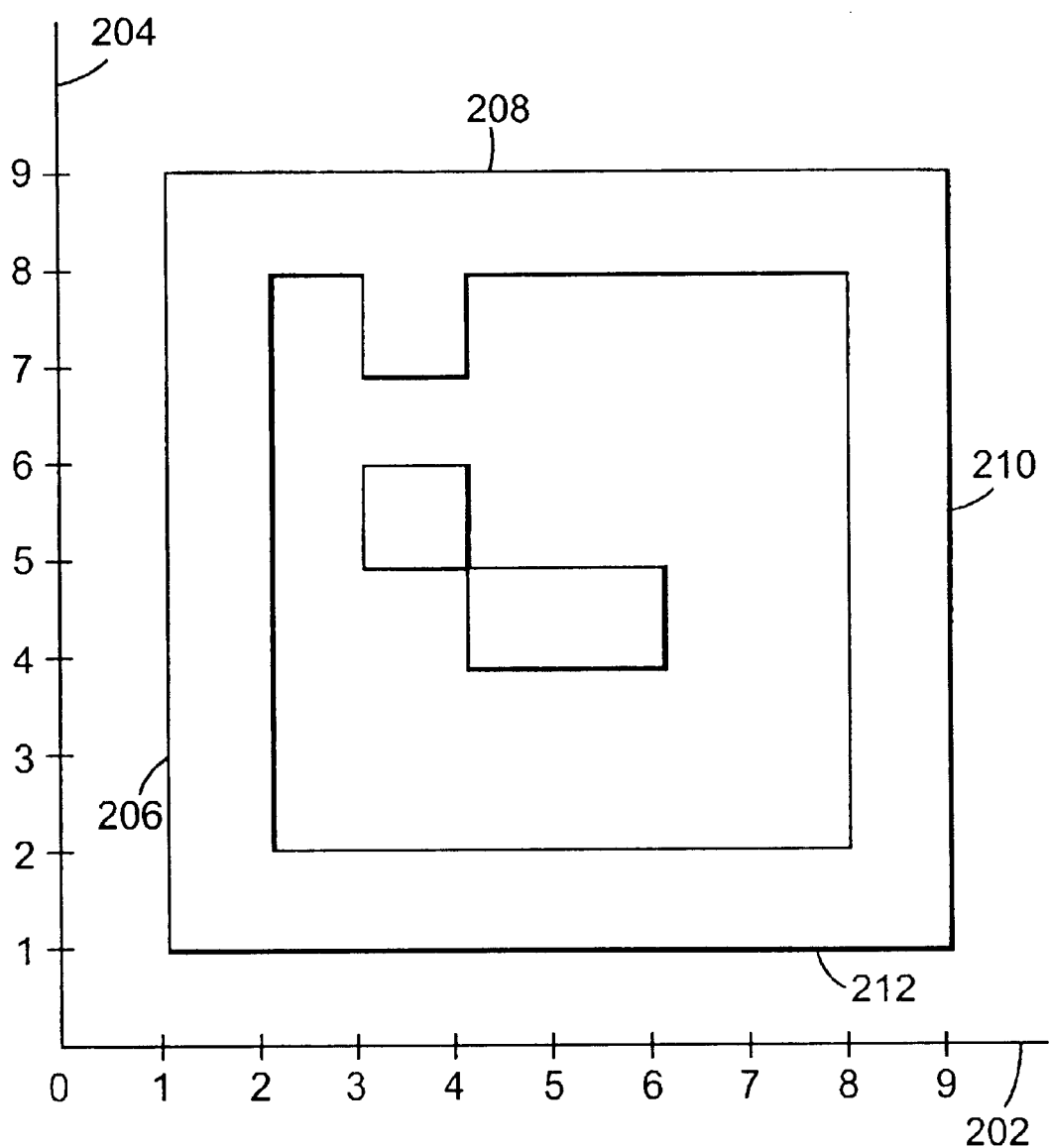
FIG. 8 is a view of the edge image of FIG. 5 shown in a Cartesian coordinate system.

For example, referring to FIG. 8, the edge image 200 is shown in a Cartesian coordinate system having axes 202 and 204. The coordinate system may be used in order to determine the relative positions of certain aspects of the edge image 200 and may be used, in particular, by any image analysis software that is used. It is noted however, that any coordinate system may be used in addition to or different from a Cartesian coordinate system. Preferably, step 308 identifies edges 206, 208, 210, and 212 of the edge image 200. The edges 206, 208, 210, and 212 define the outer boundaries of the symbol of the edge image 200. A next step 310 determines the corners of the edge image 200 by considering the intersection of the edges identified in step 308. Thus, as can be seen in FIG. 8, the intersection of the edges 206, 208, 210, and 212 occur at points (1, 1), (1, 9), (9, 9), and (9, 1) thereby defining the corners of the edge image 200.

Figure 9:
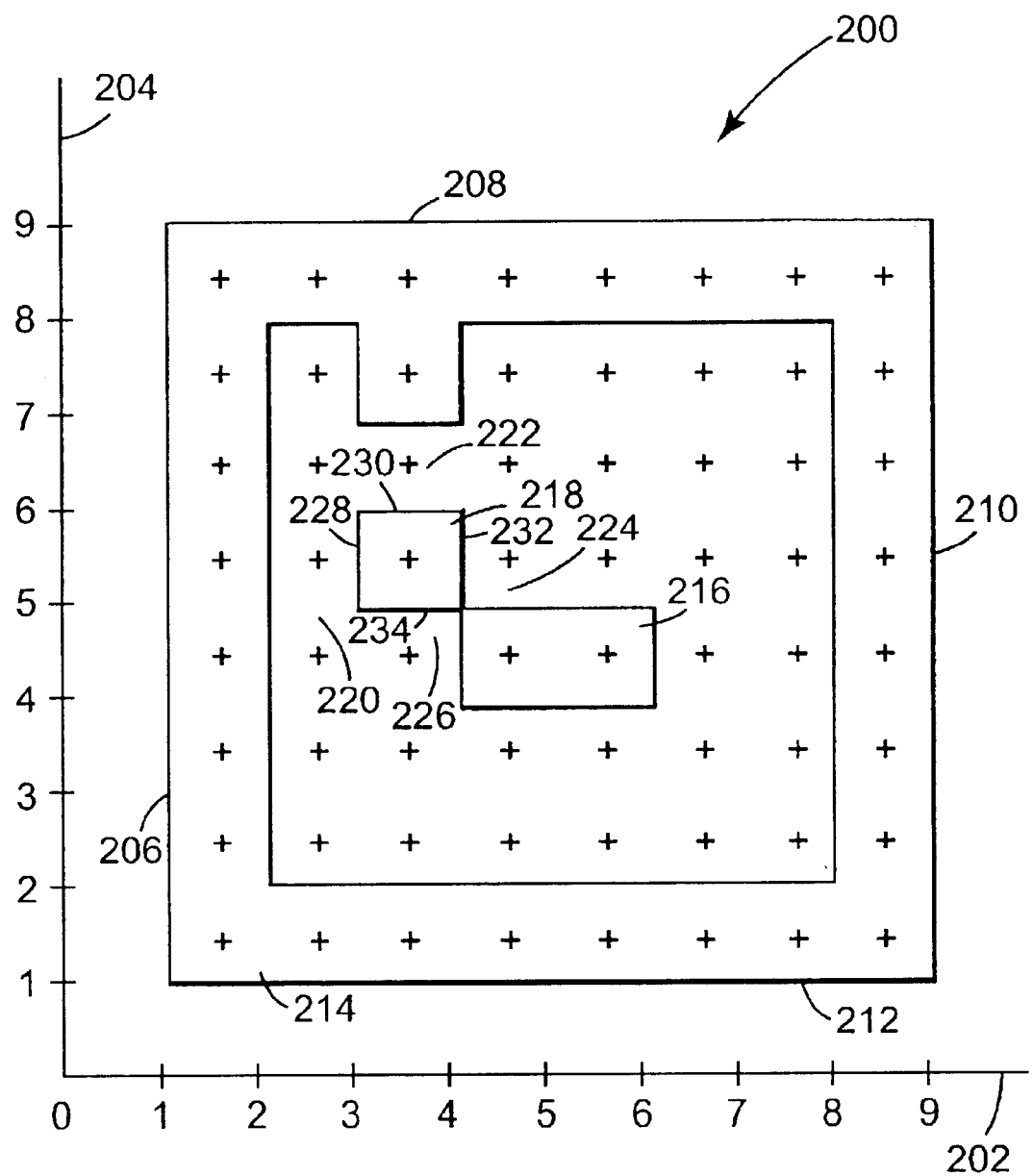
FIG. 9 is a view of the edge image of FIG. 8 further showing indications of the centers of the data cells of the symbol.

A step 312 determines the positions of the centers of the data cells of the edge image 200. In one aspect of the present invention this may be accomplished when the dimensions of the edge image 200 are known. For example, as illustrated, the edge image 200 can be known to comprise an 8×8 matrix of data cells having the edges 206, 208, 210, and 212. Accordingly, the matrix comprises 64 data cells (each data cell is 1×1). Each of the 64 data cells has a center point within the coordinate system, which can easily be determined. That is, the center of such a cell is halfway between each axis of the cell. Referring to FIG. 9, a data cell 214 is shown and has center point (1.5, 1.5). Another data cell 216 is illustrated and has center at point (5.5, 4.5). Accordingly, the center point of each of the 64 data cells of edge image 200 are illustrated as crosses in FIG. 9. It is contemplated, that the centers of the cells may be determined in any way and that the dimensions of the edge image or symbol of interest to be decoded need not be known. That is, the process 300, or a portion thereof, may be iteratively repeated by trying different matrix configurations until a solution is found. Generally, in one aspect of the present invention, the process may be repeated until the symbol decodes. It is further contemplated that this technique may be applied to any edge image or symbol and is not limited to a square matrix.

A similar step 314 determines the relative positions of the corners of the data cells within the coordinate system. Again, as above with respect to determining the centers of the data cells, the corners of the data cells can be easily determined within the coordinate system. For example, the data cell 214 has corners at (1, 1), (1, 2), (2, 2), and (2, 1). Also, the data cell 216 has corners at (5, 4), (5, 5), (6, 5), and (6, 4).

Next, a step 316 determines whether or not a particular data cell includes any edges, either valid or invalid. Determining the validity of an identified edge is described in detail below. The purpose of step 316 is to identify anything that might be an edge. Referring to FIG. 9, an exemplary data cell is identified by reference numeral 218. The data cell 218 has a center at (3.5, 5.5) and has adjacent data cells 220, 222, 224, and 226 which have centers at (2.5, 5.5), (3.5, 6.5), (4.5, 5.5), and (3.5, 4.5) respectively. In a preferred aspect of the step 316, the point between the center of a data cell of interest and the center of an adjacent data cell is evaluated to determine whether or not an edge is present. For example, the edges of the data cell 218 can be determined by looking at the points (3, 5.5), (3.5, 6), (4, 5.5), and (3.5, 5).

Accordingly, the edges 228, 230, 232, and 234 of the data cell 218 can be an identified. Preferably, this is repeated for each data cell of the edge image 200 such that all potential edges of all of the data cells of the edge image are identified. Such an evaluation may be accomplished visually or graphically and is preferably accomplished by utilizing well-known image analysis software. In other words, the edge image 200 is preferably in a digital format, which may be analyzed as such with appropriate computerized image analysis techniques, which are themselves well known in the art.

Next, a step 318 assigns numerical values to each of the corners of the data cells of the edge image, which numerical values may be used to eliminate invalid edges. Preferably, numerical values are assigned to each of the corners of each of the data cells based on the number of edges that radiate from a particular corner. In accordance with the present invention a set of numerical values may be determined that can identify a particular corner as having an invalid edge radiating therefrom. It is noted that a corner of a cell that does not have any edges radiating therefrom may be assigned a value of zero or maybe ignored altogether for the purposes of this analysis. For example, an edge that leaves a corner in a first direction can be assigned a value of 1. An edge that leaves a corner in a second direction can be assigned a value of 2. An edge that leaves a corner in a third direction can be assigned a value of 4. And, an edge that leaves a corner in a fourth direction can be assigned a value of 8. A particular corner can then be assigned a value that is the sum of the values if the edges leaving that particular corner. For the purposes of this application and for illustration, the above-described directions will be referred to as up, left, down, and right respectively with respect to the Figures of the present application.

Figure 10:
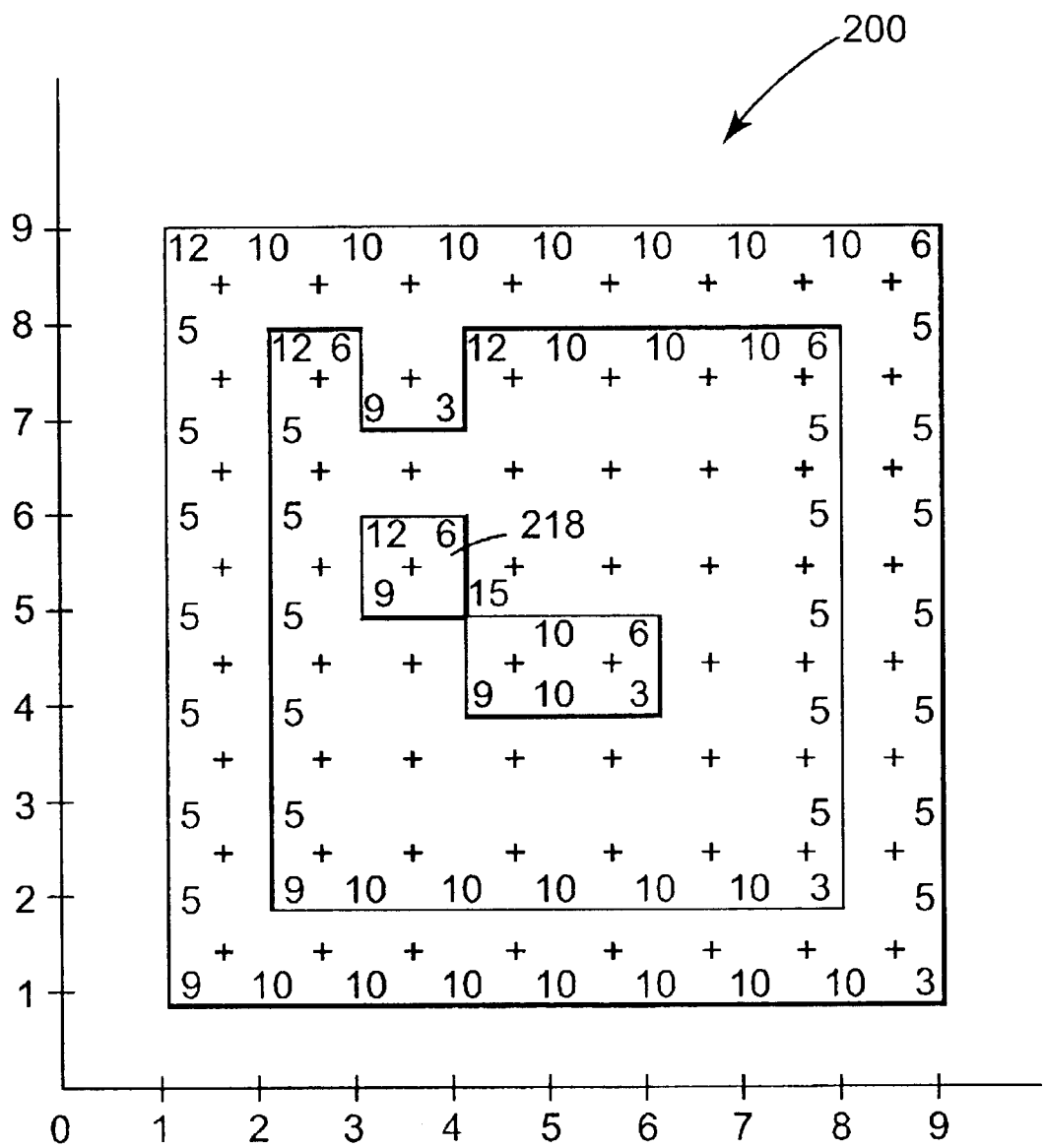
FIG. 10 is a view of the edge image of FIG. 9 further showing in particular numerical values assigned to certain corners of the data cells in accordance with an aspect of the present invention.

Accordingly, referring to FIG. 10, each of the corners of the cells having edges radiating therefrom are labeled with the values assigned from the above technique. As an example, the data cell 218 has corners at (3, 5), (3, 6), (4, 6), and (4, 5). The corner at (3, 5) includes an edge leaving in the up direction (assign a value of 1) and an edge leaving in the right direction (assign a value of 8) and therefore the corner is assigned a value of 9. The corner at (3, 6) includes an edge leaving in the down direction (assign a value of 4) and an edge leaving in the right direction (assign a value of 8) and therefore the corner is assigned a value of 12. The corner at (4, 6) includes an edge leaving in the down direction (assign a value of 4) and an edge leaving in the left direction (assign a value of 2) and therefore the corner is assigned a value of 6. Finally, the corner at (4, 5) includes an edge leaving in the down direction (assign a value of 4), an edge leaving in the left direction (assign a value of 2), an edge leaving in the up direction (assign a value of 1), and an edge leaving in the right direction (assign a value of 8) and therefore the corner is assigned a value of 15. Because, as illustrated, the edge image 200 contains edges which are all valid, each of the numerical values assigned to the corners of the cells of the edge image 200 may be utilized to indicate a valid corner having valid edges leaving therefrom. That is, in an aspect of the present invention, numerical values for corners having valid edges leaving therefrom include at least 3, 5, 6, 9, 10, 12 and 15.

Figure 11:
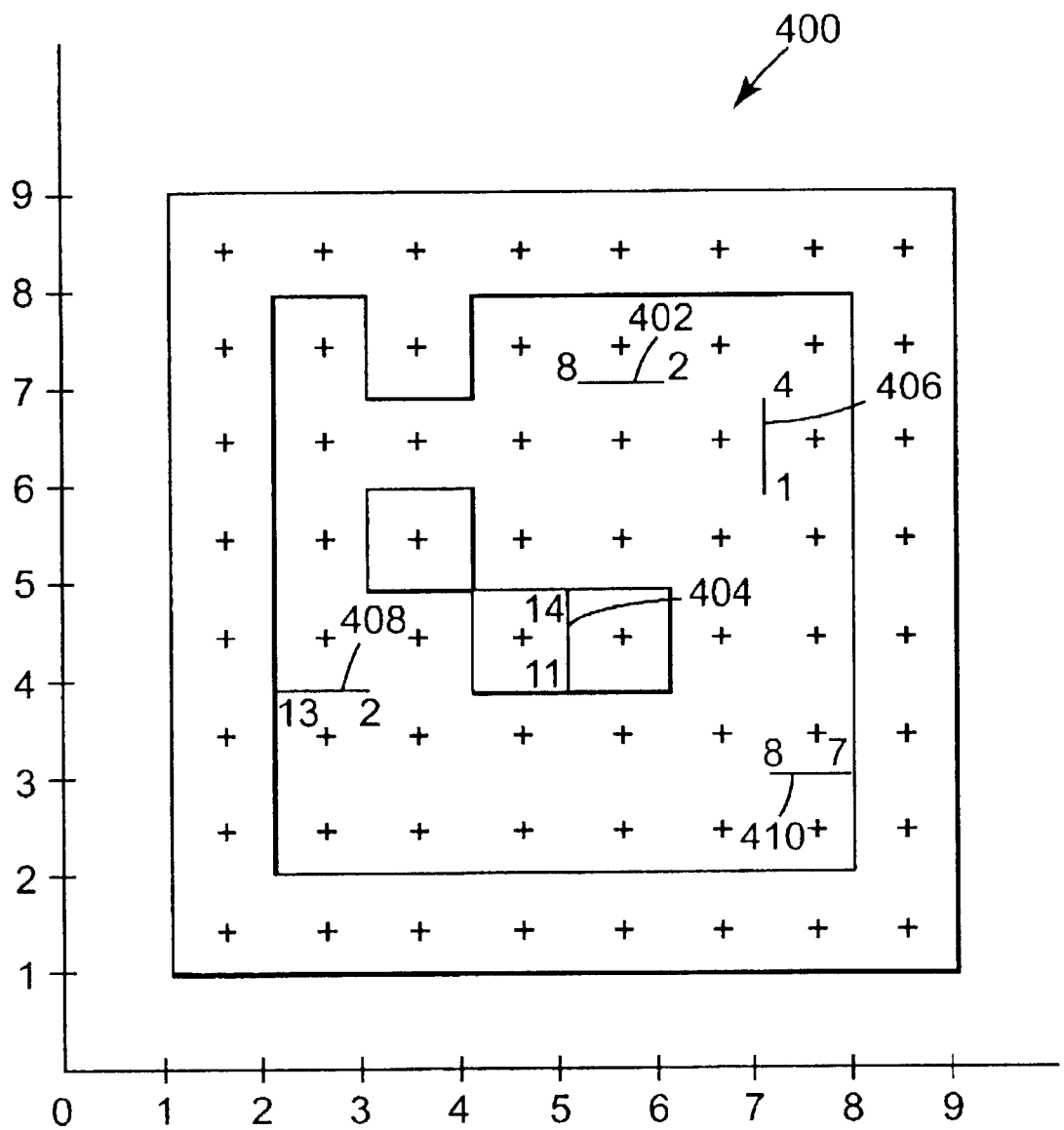
FIG. 11 is a view of the edge image of FIG. 9 but further showing exemplary invalid edges that can be determined in accordance with an aspect of the present invention.

In FIG. 11, an edge image 400 is illustrated which contains several invalid edges and which will be used in order to explain how step 318 of the process 300 may be utilized to eliminate such invalid edges. A first invalid edge 402 can be seen which leaves a cell corner located at (5, 7) and which also leaves a cell corner located at (6, 7). The edge 402 is determined to be invalid because such an edge is not physically possible in a relief or topographical pattern. Additionally, the edge 402 may be designated as invalid because such an edge is not allowed in accordance with an aspect of a particular code. Accordingly, the cell corners may be assigned numerical values of 8 and 2 respectively. As such, the numerical values of 8 and 2 identify corners that may have an invalid edge leaving therefrom. In order to determine if a particular edge is invalid, adjacent corners are considered together and where both corners have been assigned invalid numerical designations, the edge that is common to both corners may be identified as an invalid edge.

Another exemplary invalid edge 404 is illustrated in FIG. 11. As discussed above with respect to the edge 402, the edge 404 would not be a physically possible edge in a relief pattern. The edge 404 is common to the corner at (5, 5) and the corner at (5, 4). Accordingly, the corner at (5, 5) may be assigned a numerical value of 14 and the corner at (5, 4) may be assigned a numerical value of 11. Further, edges 406, 408, and 410, which also each invalid edges, are illustrated. The edges 406, 408, and 410 identify additional numerical values of 1, 4, 7, and 13 that may also be utilized in identifying invalid edges. Therefore, in an aspect of the present invention, numerical values for corners that may have invalid edges leaving therefrom include at least 1, 2, 4,7, 8, 11, 13, and 14.

Another test may be used instead of or in addition to that described above in order to eliminate invalid edges within step 320 by identifying corners that have an odd number of edges leaving therefrom. That is, in accordance with the present invention, a corner having an odd number of edges leaving therefrom indicates an error. Referring to FIG. 11, the corners at (2, 4), (3, 4), (5, 4), (5, 5), (5, 7), (6, 7), (7, 6), and (7, 7) each have an odd number of edges leaving therefrom. Specifically, for example, the corners at (5, 4), (5, 5), and (2, 4) each have three edges leaving therefrom while the remaining corners of the other invalid edges have one edge leaving therefrom. Thus, an edge may be identified as invalid where the edge is common to corners that have an odd number of edges leaving therefrom. For example, the corners at (5, 4) and (5, 5) each have three edges leaving therefrom and have common edge 404. Thus, edge 404 can be identified as invalid. Also, by the same analysis, edges 402, 406, and 408 may be identified as invalid edges.

Figure 13:
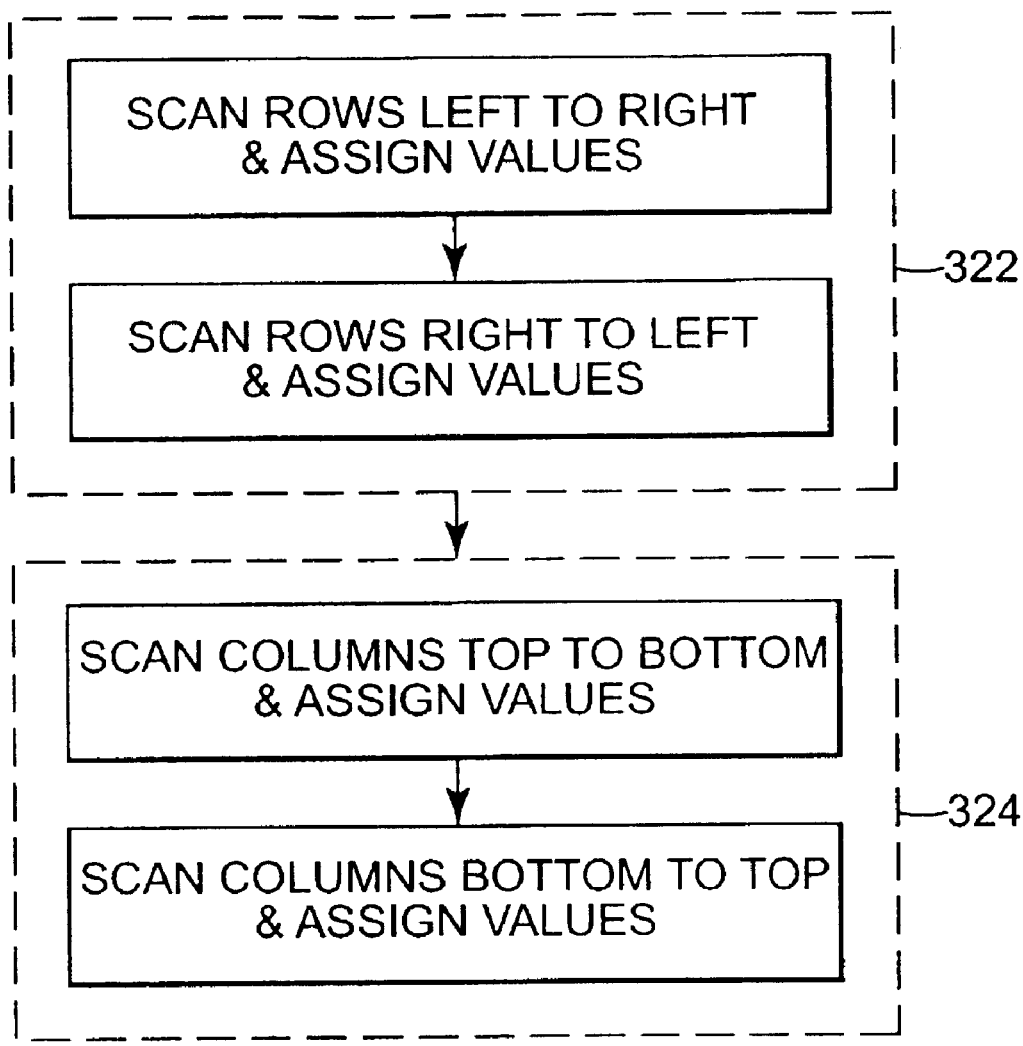
FIG. 13 is a flowchart of an edge analysis algorithm of the present invention that may be used for the steps 322 and/or 324 of the flowchart of FIG. 7.

Before the message contained in a symbol or edge image (such as the edge image 400) can be decoded, logical values or codes are assigned to each of the data cells. Preferably, binary values that indicate on or off, black or white, etc., such as the numerical values of 0 and 1, are used. As such, a further step 322 can be conducted that scans a row to assign binary values to each of the data cells followed by a step 324 that scans a column to assign binary values to each of the data cells. Referring to FIG. 13 the steps 322 and 324 may comprise scans in opposing directions for providing further error checking capability as described below. It is noted that the rows and columns may be scanned in any order including simultaneously. It is noted that a decode step 326 may be performed at any time after binary values are assigned to the cells. For example, after one or both of a row or column scan is performed the decode step 326 may be performed (see line 323 in FIG. 7). Moreover, at any point in the process where a binary value can be assigned to one or more data cells a decode step can be performed.

Figure 12:
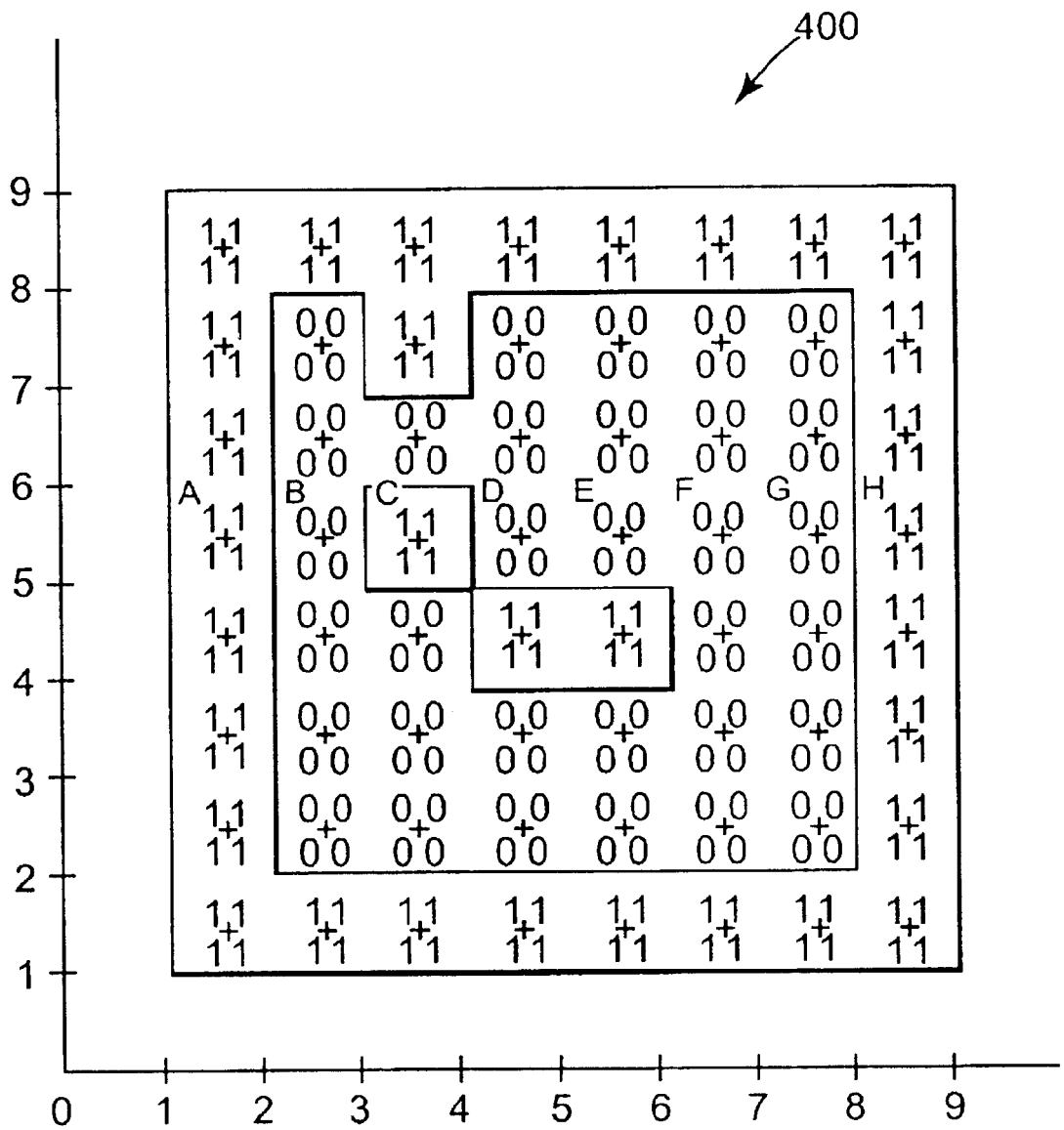
FIG. 12 is a view of the edge image of FIG. 9 showing in addition binary values assigned to the data cells of the edge image also in accordance with another aspect of the present invention.

A scan in the rows of step 322 may first be performed in the direction of left to right of each of the rows of the edge image 400. Preferably, a binary value, such as 0 or 1, is assigned to each of the data cells for creating a symbol image 400 with properly identified data cells that may subsequently be decoded. Values are assigned by first assigning an initial value such as 1 to the first data cell of a row (the left most data cell). Next, a value is assigned to an adjacent data cell depending upon whether there is an edge between the adjacent data cells or not. If an edge is present, the adjacent cell is assigned the value opposite from the value of the previous data cell. If no edge is present, the adjacent data cell is assigned the same value as the previous cell. For example, FIG. 12 illustrates binary values that could be assigned by such as scan. To conduct a left to right scan of step 322, the binary values can be positioned in the lower right quadrant of the cross that marks the center of each of the data cells. A scan can also be performed in the opposite or right to left direction of the rows and values can be positioned in the upper right quadrant of the crosses that mark the center of each of the data cells. As will be described below, the values obtained by a scan in the columns by step 324 can be positioned in the upper left quadrant for a top to bottom scan and in the lower left quadrant for a bottom to top scan.

As an example, the row of the edge symbol 400, shown in FIG. 12, which contains the data cells that have their centers at (5.5, 1.5), (5.5, 2.5), (5.5, 3.5), (5.5, 4.5), (5.5, 5.5), (5.5, 6.5), (5.5, 7.5), and (5.5, 8.5), will be described. Each of the data cells has been labeled as A, B, C, D, E, F, G, and H respectively for reference. Firstly, the initial data cell, specifically, the data cell labeled by A is assigned the value of 1.Next, because there is an edge between the data cells A and B, the data cell B is assigned the binary value opposite that of the previous data cell or 0. Again, because there is an edge between the data cells B and C, the data cell C is assigned the binary value of 1. And, for the same reason, the data cell D is assigned the binary value of 0. Because there are no edges present between the data cells D and E, E and F, and F and G, the data cells E, F, and G are assigned to the binary value of 0. Finally, because there is an edge between the data cells G and H, the data cell H is assigned the binary value of 1.

Preferably, binary values are assigned to all of the cells by scanning the rows in both directions and in the manner described above. Thus, the resulting binary values are positioned in the upper and lower right quadrants of the crosses that mark the centers of each of the data cells for a right to left and left to right scan respectively and are shown in FIG. 12 for the edge image 400. Also, each of the columns of the edge image are preferably scanned and assigned binary values in the same manner as was performed above with respect to the scan of the rows of the edge image 400. Accordingly, the resulting binary values for the columns are positioned in the upper and lower left quadrants of the crosses that mark the centers of each of the data cells for a top to bottom and a bottom to top scan respectively.

Next, a step 336 determines the binary values for each of the data cells by analyzing the binary value assigned by the four scans of steps 322 and 324. This analysis may include considering the net value of the four scans. For example, referring to data cell A of FIG. 12, the net value of the binary values assigned to cell A is 4 (1+1+1+1). Each of the scans has assigned a value of 1 to the cell. In other words, the binary value of cell A is unanimously equal to 1 as all of the scans are in agreement. Accordingly, a net value of the four scans of steps 322 and 324 equal to four may be used to indicate that the data cell can be assigned a binary value of 1. Similarly, the data cell B has been assigned the binary value of zero for each of the four scans. Thus, for the same reason, a net value of zero for the four scans may be used to indicate that the data cell can be assigned the binary value of zero. Once the binary values for all the data cells have been determined by step 336 a step 326 may be performed, which step 326 attempts to decode the edge image based on the binary values assigned in 336. If the edge image is successfully decoded, a decision may be made at a step 328 to save the message and proceed to a step 330, which step 330 considers whether or not more objects have been identified in step 304. If there are more objects to consider then the process 300 proceeds to a step 332, which begins the analysis of a next object in accordance with the present invention. If there are no other objects to be analyzed then the process ends at a step 334. It is noted that if the edge image cannot be decoded then the process may continue to step 330 to consider any other objects or the decode may be re-tried. For example, the decode may be re-tried with different thresholds defined in order to decode the message.

Figure 14:
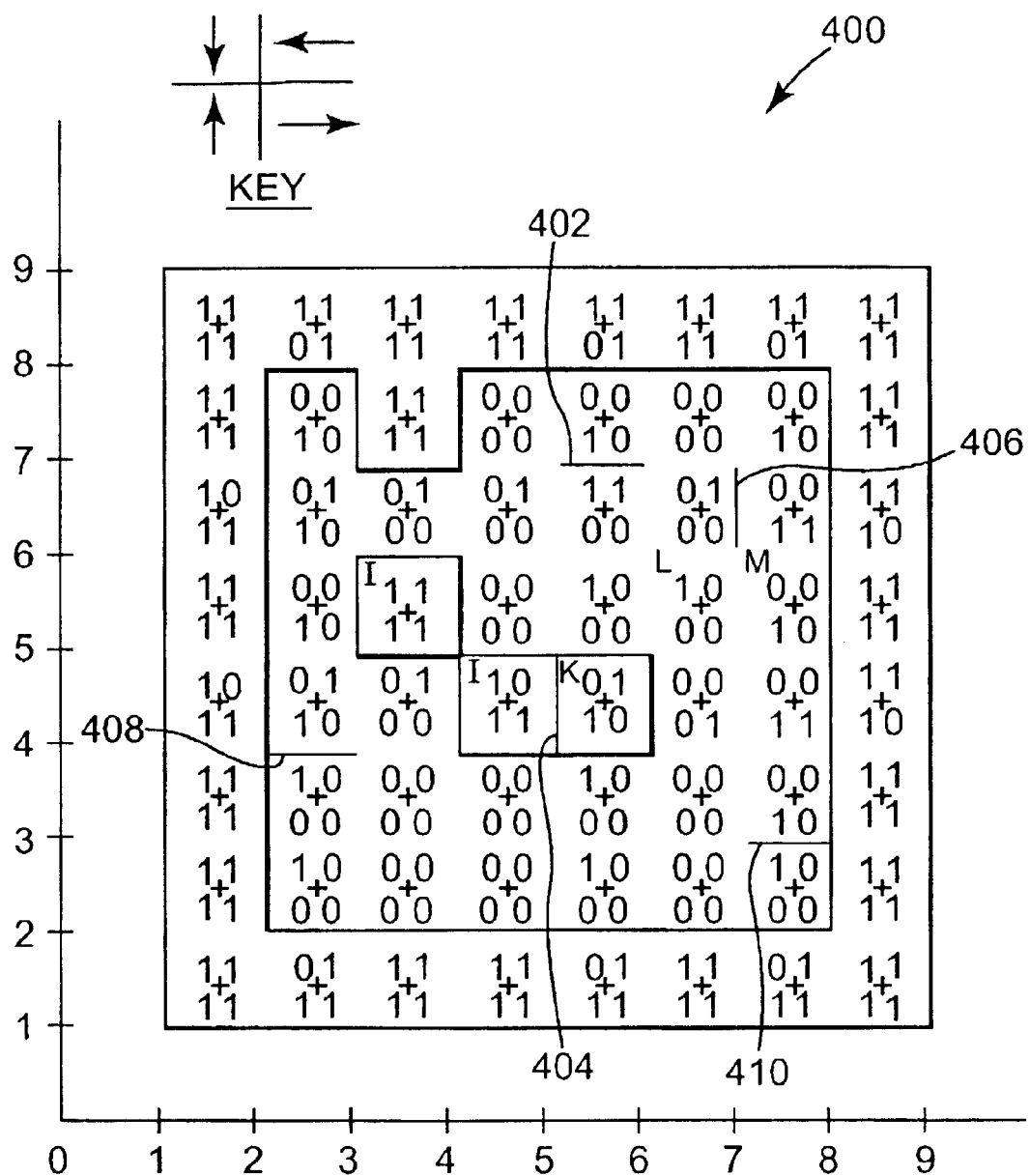
FIG. 14 is a view of the edge image of FIG. 11 showing in addition binary values assigned to the data cells of the edge image also in accordance with another aspect of the present invention.

With respect to the binary values assigned to the cells of the edge image 400 shown in FIG. 12 for the four scans discussed above, it is noted that the edge image 400 of FIG. 12 does not include any invalid edges. As such, the edge image 400 of FIG. 12 is shown in FIG. 14 with several invalid edges illustrated (edges 402, 404, 406, 408, and 410) in order to explain how the scans of steps 322 and 324 can be used to assign binary values to the cells of the edge image that can be used to decode the edge image. Several data cells are labeled as I, J, K, L, and M for reference. Also, FIG. 14 shows the binary values that can be assigned by the four scans of steps 322 and 324. Firstly, the binary value of 1 may be assigned to the data cells that have a net value of four for the binary values assigned by the four scans of steps 322 and 324 (see cell I). Also, for those cells that have a net value of zero the binary value of zero may be assigned (see cell L). A net value of either 1 or 3 for a cell indicates that the correct binary value for the cell was known in 3 out of 4 of the scans. In other words, the correct binary value was known in both of the scans (forward and backward) for either a row or column but not both. For example, referring to the cell labeled M in FIG. 14, a net value of 1 for the cell M may be assigned. In the column scan from top to bottom a binary value of zero has been assigned while the scan from bottom to top disagrees and assigns a binary value of 1. However, both the right to left and left to right scans agree and assign a binary value of zero. Therefore, because the binary value of zero has been assigned by 3 of the 4 scans, the cell may be assigned the binary value of zero to be used to decode the edge image 400. The same analysis may be used for a cell having a net value of 3. For example, the cell labeled J has a net value of 3 and may be assigned the binary value of 1 because the binary value of 1 was assigned for 3 out of the 4 scans. Finally, a net value of 2 for a cell indicates that scans in opposite directions of a row and column are in disagreement. Thus, such a cell cannot be assigned a binary value and may be labeled as unknown. For example, the cell labeled K has a net value of 2 and may be labeled as unknown.

It is noted that if only a top to bottom column scan and a left to right row scan were performed, for example, a binary value of zero might have been assigned to cell K in error (cell K should be assigned the binary value of 1). Because it is generally preferred that a cell be identified as unknown rather than incorrect, performing four scans provides sufficient information to assign correct binary values to certain cells and to identify certain other cells as unknown particularly where invalid edges are present. Accordingly, assignment of incorrect binary values to cells can be minimized or eliminated.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of determining features of a symbol based on a relief pattern having a two-dimensional matrix of data cells representing encoded information, the method comprising the steps of:

determining the presence of discernible edges of the relief pattern and compiling information representative of an edge image at least partially representative of the two-dimensional matrix of data cells and including the discernible edges;

validating the edge image by performing an edge analysis of at least one of the discernable edges; and determining data cells of the symbol from the edge image so that the symbol can be decoded to provide the information encoded within the relief pattern of the symbol.

2. The method of claim 1, wherein the step of determining the presence of discernible edges of the relief pattern comprises imaging the relief pattern of the symbol with an imaging device.

3. The method of claim 2, wherein the imaging of the relief pattern comprises obliquely directing light onto the relief pattern.

4. The method of claim 3, wherein the imaging of the relief pattern further comprises utilizing contrast in light reflectivity to determine the presence of discernible edges.

5. The method of claim 1, wherein the validating step comprises assigning a symbolic value indicative of the validity of a discernable edge to an intersection of a plurality of discernable edges.

6. The method of claim 5, wherein the symbolic value comprises a numerical value.

7. The method of claim 6, wherein a numerical value indicative of the validity of a discernable edge assigned to the intersection of a plurality of discernable edges is based on the number of discernable edges that form the intersection of a plurality of discernable edges.

8. The method of claim 6, wherein the validating step include validating the discernable edge based on a numerical value assigned to a first intersection of discernable edges, which first intersection includes the discernable edge to be validated.

9. The method of claim 8, wherein the validating step further includes validating the discernable edge based on a numerical value assigned to a second intersection of discernable edges, which second intersection includes the discernable edge to be validated.

10. The method of claim 1, wherein the validating step includes validating a discernible edge by determining the number of discernible edges that radiate from a first intersection of a plurality of discernible edges, which first intersection includes the discernable edge to be validated.

11. The method of claim 10, wherein the validating step further includes validating a discernible edge by determining the number of discernible edges that radiate from a second intersection of a plurality of discernible edges, which second intersection includes the discernable edge to be validated and which is adjacent to the first intersection of discernable edges.

12. The method of claim 1, wherein the determining a data cell step comprises assigning a binary value to at least one data cell so that the symbol can be decoded.

13. The method of claim 12, wherein the assigned binary value comprises zero or one.

14. The method of claim 12, wherein the determining a data cell step comprises scanning the edge image in a first direction to assign a binary value to at least one data cell.

15. The method of claim 14, wherein the first direction comprises a row of the edge image.

16. The method of claim 15, wherein the row is scanned in a left to right direction to assign a binary value to the at least one data cell and the row is also scanned in a right direction to left direction to assign a binary value to the at least one data cell.

17. The method of claim 16, wherein the determining a data cell step further comprises scanning the edge image in a second direction to assign a binary value to at least one data cell by the scan in the first direction.

18. The method of claim 17, wherein the second direction comprises a column of the edge image.

19. The method of claim 18, wherein the column is scanned in a top to bottom direction to assign a binary value to the at least one data cell and the column is also scanned in a bottom to top direction to assign a binary value to the at least one data cell.

20. The method of claim 19, wherein plural binary values assigned to the at least one data cell are analyzed to determine a single binary value for the at least one data cell.

21. The method of claim 12, further comprising the step of decoding the edge image based on the assigned binary value to provide the information encoded within the symbol.

22. An apparatus for reading features of a symbol based upon a relief pattern having a two-dimensional matrix of data cells representing encoded information, the apparatus comprising:
means for sensing a reflected light pattern and creating an edge image at least partially representative of the two-dimensional matrix of data cells and based upon the reflected light from the relief pattern; and
means for verifying the validity of a discernable edge of the edge image and for determining a data cell of a symbol based on the relief pattern so that the symbol can be decoded to provide the information encoded within the relief pattern.

23. The apparatus of claim 22, as part of a system including a light source capable of at least partially illuminating the relief pattern so that the at least one discernable edge can be read.

24. The apparatus of claim 22, wherein the means for sensing a reflected light pattern and creating an edge image comprises a reader.

25. The apparatus of claim 24, wherein the reader comprises at least one sensor capable of sensing at least a portion of the reflected light from the relief pattern.

26. The apparatus of claim 25, wherein the reader further comprises memory for storing instruction sets and for storing an image to be decoded.

27. The apparatus of claim 25, wherein the reader further comprises a central processing unit for controlling a decoding algorithm for analyzing the edge image.

28. The apparatus of claim 25, wherein the reader further comprises an imaging device for converting the sensed reflected light pattern into a plurality of electrical signals.

29. The apparatus of claim 26, wherein the imaging device comprises a charge-coupled device.

30. The apparatus of claim 26, wherein the imaging device comprises a CMOS imaging device.

31. A method of determining features of a symbol based on a relief pattern having a data cell with at least one discernible edge and representing encoded information, the method comprising the steps of:
determining the presence of discernible edges of the relief pattern and compiling information representative of an edge image including the discernible edges;
validating the edge image by performing an edge analysis of at least one of the discernable edges, the edge analysis comprising assigning a symbolic value indicative of the validity of a discernable edge to an intersection of a plurality of discernable edges; and
determining a data cell of the symbol from the edge image so that the symbol can be decoded to provide the information encoded within the relief pattern of the symbol.

32. A method of determining features of a symbol based on a relief pattern having a data cell with at least one discernible edge and representing encoded information, the method comprising the steps of:
determining the presence of discernible edges of the relief pattern and compiling information representative of an edge image including the discernible edges;
validating the edge image by performing an edge analysis of at least one of the discernable edges, the edge analysis comprising determining the number of discernible edges that radiate from a first intersection of a plurality of discernible edges, which first intersection includes the discernable edge to be validated; and
determining a data cell of the symbol from the edge image so that the symbol can be decoded to provide the information encoded within the relief pattern of the symbol.

* * * * *